US010836311B2

United States Patent
Seki et al.

(10) Patent No.: US 10,836,311 B2
(45) Date of Patent: Nov. 17, 2020

(54) INFORMATION-PRESENTING DEVICE

(71) Applicant: SUBARU CORPORATION, Tokyo (JP)

(72) Inventors: Junya Seki, Tokyo (JP); Eisuke Konishi, Tokyo (JP); Koichi Mizutani, Tokyo (JP); Masayuki Murakoshi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 27 days.

(21) Appl. No.: 15/949,939

(22) Filed: Apr. 10, 2018

(65) Prior Publication Data

US 2018/0304811 A1 Oct. 25, 2018

(30) Foreign Application Priority Data

Apr. 20, 2017 (JP) .................................. 2017-083347

(51) Int. Cl.
*B60R 1/00* (2006.01)
*G06K 9/00* (2006.01)

(52) U.S. Cl.
CPC ............. *B60R 1/00* (2013.01); *G06K 9/00805* (2013.01); *B60R 2300/105* (2013.01); *B60R 2300/205* (2013.01); *B60R 2300/802* (2013.01)

(58) Field of Classification Search
CPC ..... B60R 1/00; B60R 2300/105; B60R 11/04; B60R 2300/802; H04N 7/181
See application file for complete search history.

(56) References Cited

U.S. PATENT DOCUMENTS

2015/0015718 A1* 1/2015 Fujimatsu .......... G06K 9/00771
   348/159
2016/0342850 A1* 11/2016 Elimalech .............. G08G 1/161

FOREIGN PATENT DOCUMENTS

JP   H06-227318 A   8/1994
JP   H10-257482 A   9/1998
(Continued)

OTHER PUBLICATIONS

Japanese Office Action issued in corresponding Japanese Patent Application No. 2017-083347, dated Feb. 12, 2019, with English Translation.

(Continued)

*Primary Examiner* — Frank F Huang
(74) *Attorney, Agent, or Firm* — McDermott Will & Emery LLP

(57) ABSTRACT

An information-presenting device includes an imaging unit, a display unit, an object-recognition unit, an exit location indicator unit and an entry location indicator unit. The imaging unit captures an image of a side view from a host vehicle. The display unit displays an image captured by the imaging unit or a image generated based on the captured image. The object-recognition unit recognizes an object lateral to the host vehicle moving relative to the host vehicle. The exit location indicator unit displays an exit location indicator at or near a location where the object is last displayed in the display unit when the object departs from a display range of the display unit. The entry location indicator unit displays an entry location indicator in a window through which an occupant views outside of the vehicle or in a peripheral region of the window. The entry location indicator indicates a location where the object is predicted to appear.

8 Claims, 6 Drawing Sheets

(56) References Cited

FOREIGN PATENT DOCUMENTS

| | | |
|---|---|---|
| JP | 2003-291688 A | 10/2003 |
| JP | 2012-133699 A | 7/2012 |
| JP | 2017-005352 A | 1/2017 |

OTHER PUBLICATIONS

Japanese Notification of Reasons for Refusal issued in corresponding Japanese Patent Application No. 2017-083347, dated Apr. 23, 2019, with English Translation.

* cited by examiner

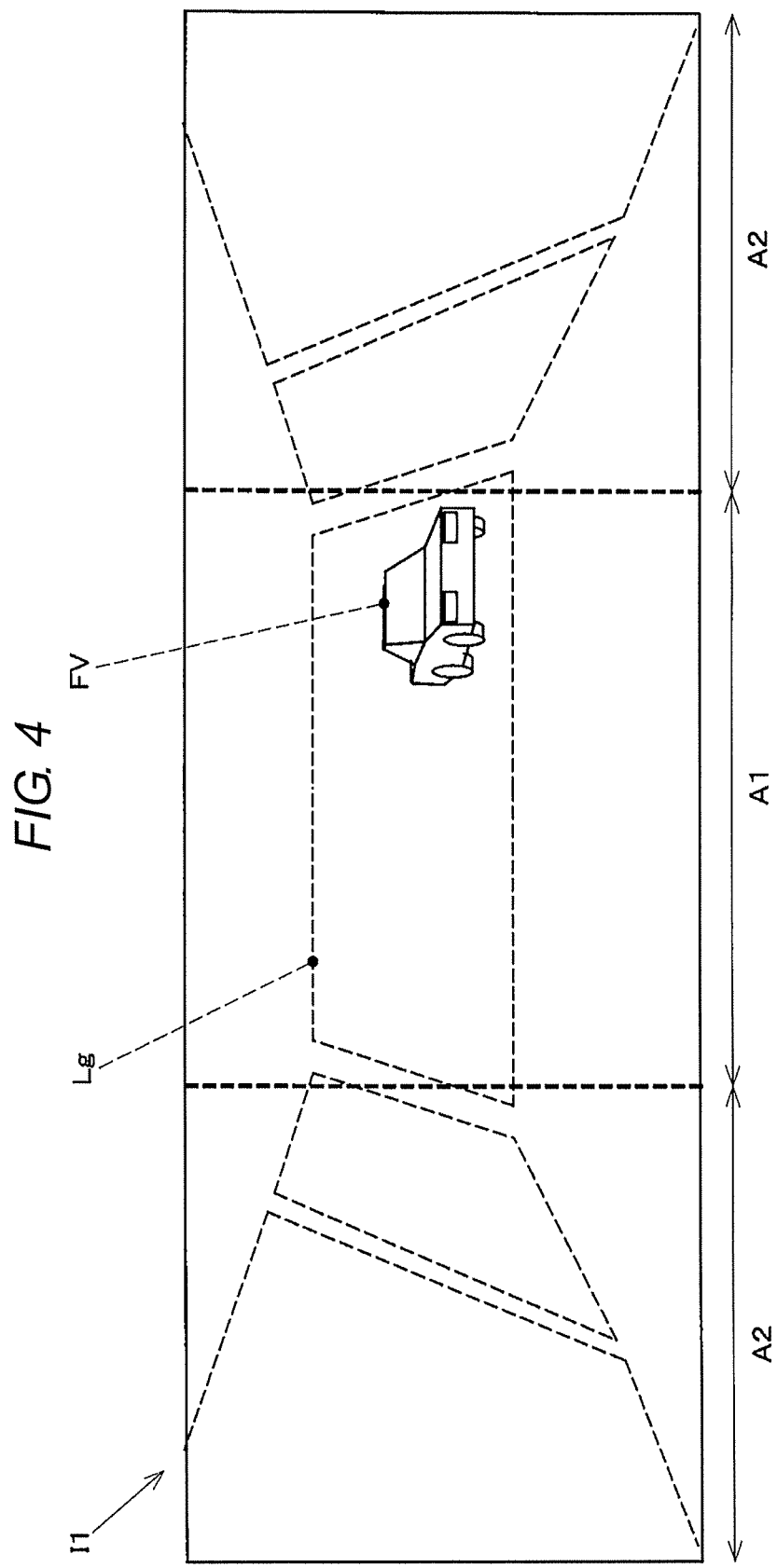

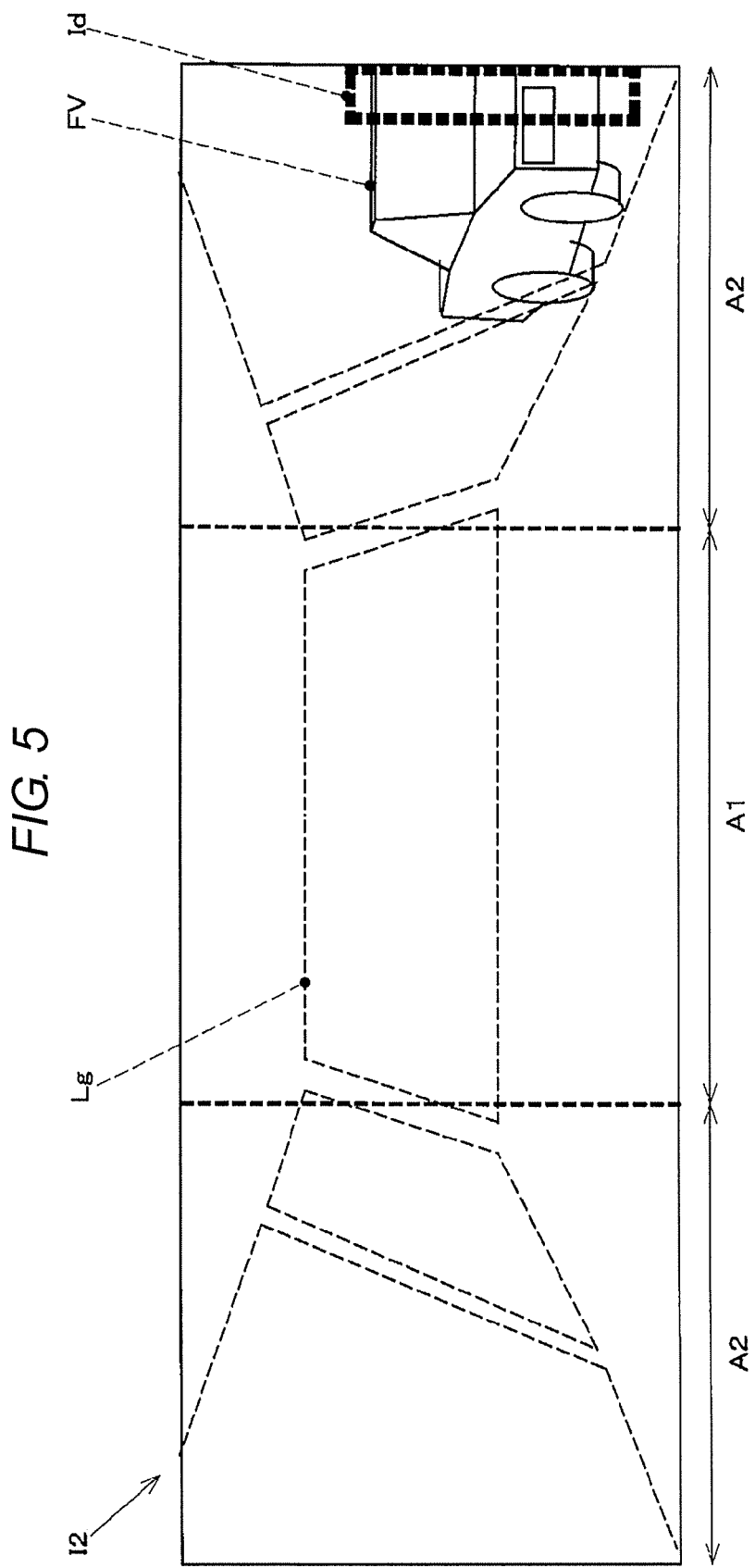

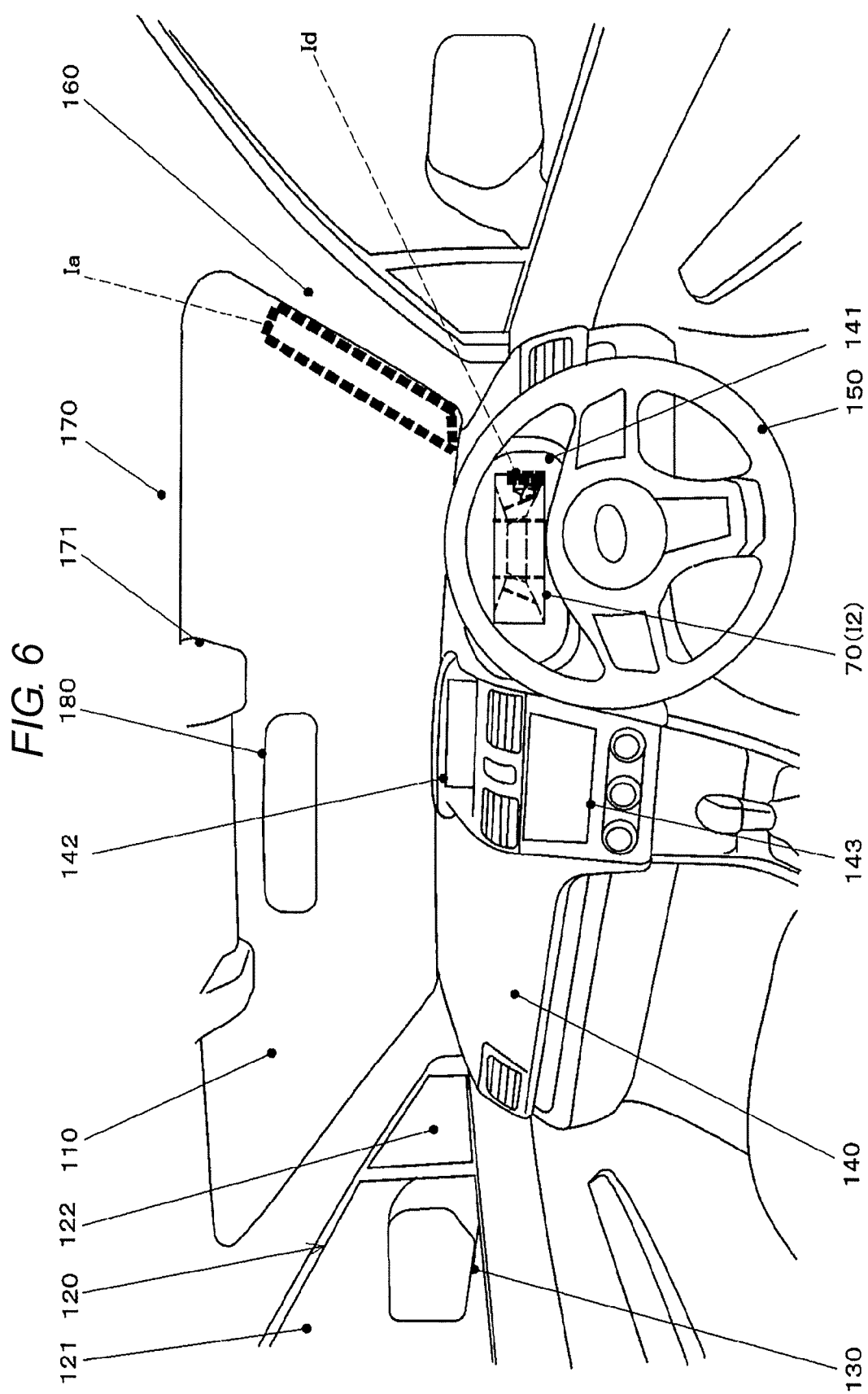

INFORMATION-PRESENTING DEVICE

CROSS-REFERENCE TO RELATED APPLICATIONS

The present application claims priority from Japanese Patent Application No. 2017-083347 filed on Apr. 20, 2017, the entire contents of which are hereby incorporated by reference.

BACKGROUND

1. Technical Field

The present invention relates to an information-presenting device provided in a vehicle such as an automobile and more particularly to an information-presenting device which prevents a user from losing sight of an object when the object departs from a display device that displays an image captured of a side view from the host vehicle.

2. Related Art

In a vehicle such as an automobile, use of an image display device (i.e., a monitoring camera system) that displays an image captured by cameras provided at a side portion, a rear portion of a vehicle body in place of or in combination with conventional mirrors has been proposed as a rear-side view monitoring unit of a vehicle.

As a prior art relating to such an image display device, Japanese Unexamined Patent Application Publication (JP-A) No. 10-257482, for example, discloses a vehicle surrounding condition display device for displaying vehicle left and right side images captured by CCD cameras attached in proximity to a left and a right door mirror, and an image of the rear portion of the vehicle captured by a CCD camera attached to the rear portion of the vehicle, on a liquid crystal panel installed on an instrument panel, wherein one infinity point is set by combining infinity points from each of the left, right, and rear sides, and the left, right, and rear side images are synthesized as seen from one virtual viewpoint.

Japanese Unexamined Patent Application Publication (JP-A) No. 6-227318 discloses a rearview monitoring device of a vehicle in which captured images by cameras provided on the left and right sides of a vehicle body are displayed to a driver, and a display of each image is enlarged or reduced in accordance with steering, operating turn signals, braking, operating the transmission.

In addition, JP-A No. 6-227318 describes that when a degree of danger of displayed objects is determined and the degree of danger is high, attention is drawn by changing colors of the objects and existing areas on the display, activating an alarm sound.

SUMMARY OF THE INVENTION

An aspect of the present invention provides an information-presenting unit, including: an imaging unit configured to capture an image of a side view from a host vehicle; a display unit configured to display, as a display image, a captured image captured by the imaging unit or a generated image generated on a basis of the captured image; an object-recognition unit configured to recognize an object at a side of the host vehicle, the object moving relative to the host vehicle; an exit location indicator unit configured to display an exit location indicator at or near a location where the object recognized by the object-recognition unit is last displayed in the display unit when the object departs from a display range of the display unit, and an entry location indicator unit configured to display an entry location indicator in a window through which an occupant views outside of the vehicle or in a peripheral region of the window. The entry location indicator indicates a location in which the object is predicted to appear.

BRIEF DESCRIPTION OF THE DRAWINGS

FIG. 4 is a drawing illustrating an instance of a display image of the information-presenting device according to the example in which another vehicle is in the rear view from the host vehicle.

FIG. 5 is a drawing illustrating another instance of a displayed image in the information-presenting device according to the example in which another vehicle is in a rear-side view from the host vehicle.

FIG. 6 is a drawing illustrating another instance of a user's field of view in the vehicle having the information-presenting device according to the example, and illustrates an indication of an entry location.

DETAILED DESCRIPTION

Figure 1:
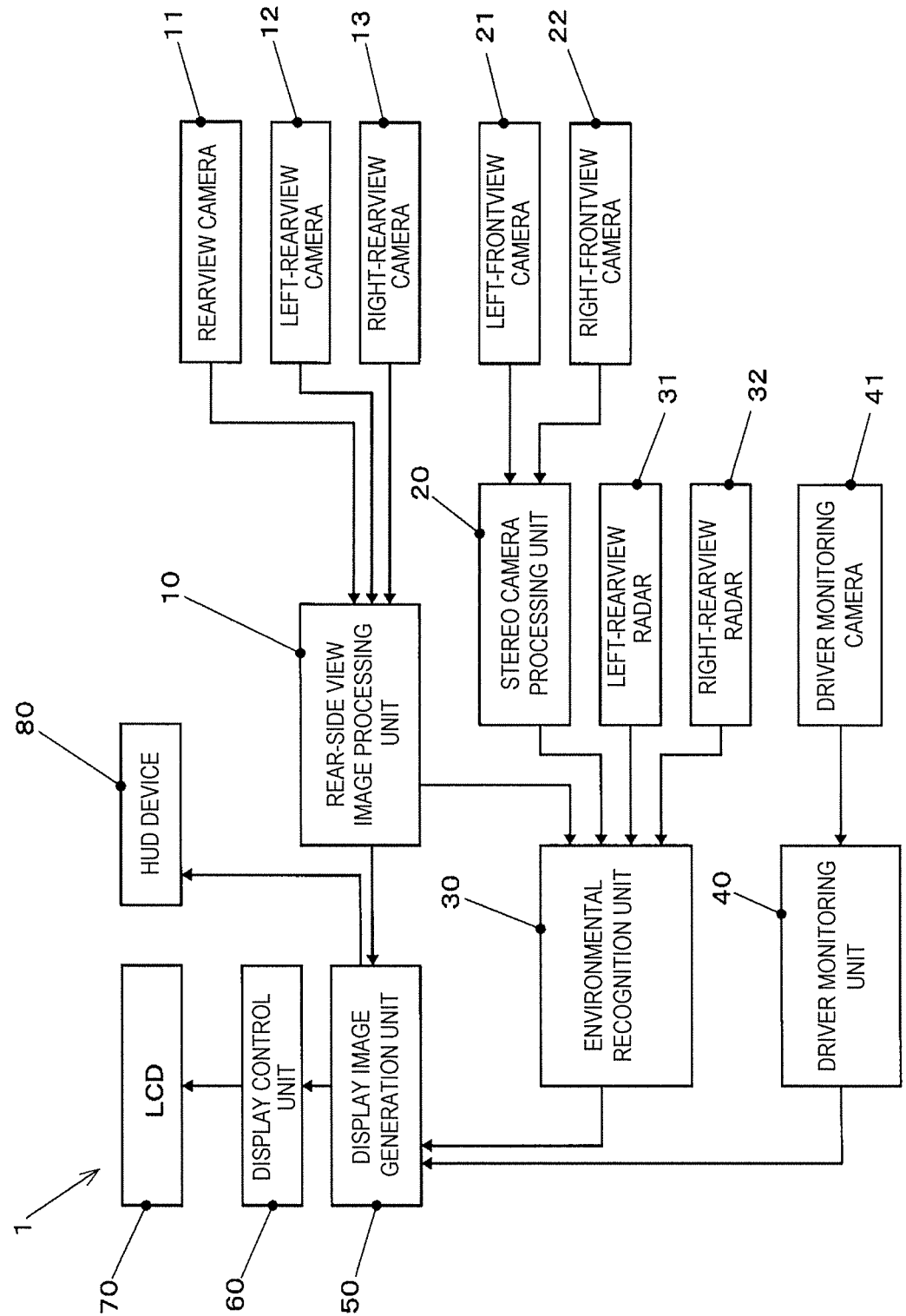
FIG. 1 is a block diagram illustrating a configuration of an example of an information-presenting device to which the present invention is applied.

An example of an information-presenting device to which the present invention is applied will be described below. Note that the following description is directed to an illustrative example of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

In a vehicle provided with a monitoring camera system, when another vehicle, for instance, passes the host vehicle, an image of the other vehicle first appears in the display image of the image display device as the other vehicle approaches from the rear. The image of the other vehicle then moves toward the side edge of the display image in accordance with the advancement of the other vehicle's relative position with respect to the host vehicle. Finally, the image of the other vehicle exits from the display image.

On the other hand, in the front view, which is visible to the naked eye of the user, the other vehicle emerges from, for instance, the side of the windshield, as the other vehicle advances relative to the host vehicle.

Here, the object size or movement direction may appear differently in the display image and the actual front view, and there may be a temporary period of time in which the object cannot be viewed in both the front view image and the side view image.

In such cases, if the user loses sight of the object, there is a concern that the safety conditions around the vehicle are inadequate.

In view of the above-mentioned circumstance, it is desirable to provide an information-presenting device in which the user is prevented from losing sight of the object when the object departs from the display device that displays an image captured of a side view from the host vehicle.

The information-presenting device according to the example is provided in a vehicle such as a passenger car and includes a monitoring camera system that presents an image, obtained by imaging the rear-side view from the vehicle body with cameras, to a user such as a driver through an LCD.

FIG. 1 is a block diagram illustrating a configuration of an example of an information-presenting device to which the present invention is applied.

The information-presenting device 1 includes a rear-side view image processing unit 10, a rearview camera 11, a left-rearview camera 12, a right-rearview camera 13, a stereo camera processing unit 20, a left-front view camera 21, a right-front view camera 22, an environment recognition unit 30, a left-rearview radar 31, a right-rearview radar 32, a driver monitoring unit 40, a driver monitoring camera 41, a display image generating unit 50, a display control unit 60, LCD 70, an HUD device 80, and so on.

The rear-side view image processing unit 10 is a digital signal processor device that processes output signals of the rearview camera 11, the left-rearview camera 12, and the right-rearview camera 13 and outputs the processed signals as image data.

The image signal output from the rear-side view image processing unit 10 is transmitted to the environment recognition unit 30 and the display image generating unit 50.

The rearview camera 11, the left-rearview camera 12, and the right-rearview camera 13 capture video of conditions around the vehicle and output image signals in real time, and include a solid-state imaging device such as a CMOS and a driving device thereof, a lens, and so on.

Figure 2:
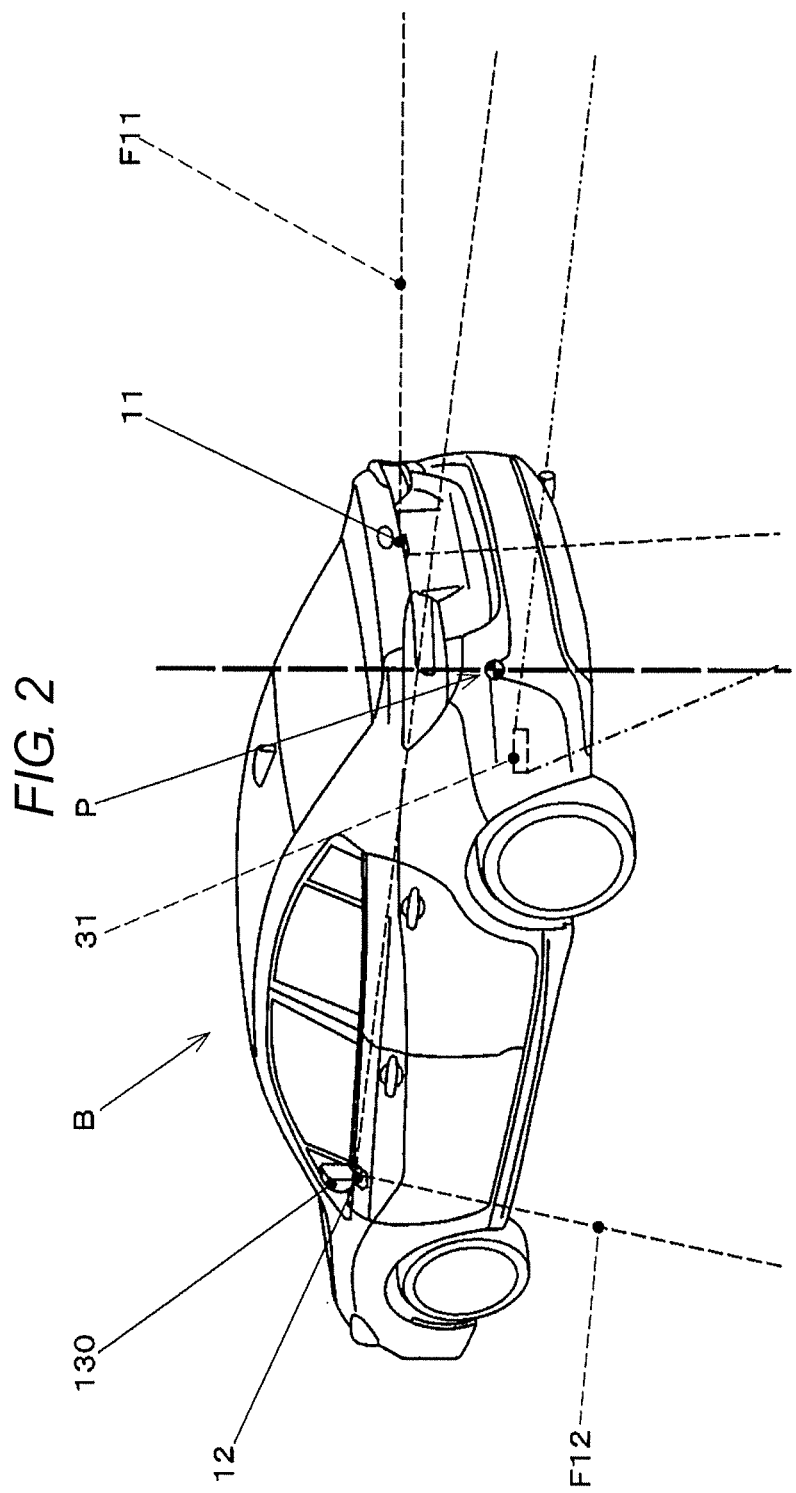
FIG. 2 is a schematic perspective drawing illustrating an arrangement of rear-side view cameras, in the information-presenting device according to the example.

FIG. 2 is a schematic perspective drawing illustrating an arrangement of rear-side view cameras or the like in the information-presenting device according to the example.

The rearview camera 11 is disposed at the center of the vehicle width direction at the rear end of the vehicle body B such that the optical axis is directed toward the vehicle rear.

The left-rearview camera 12 is disposed on the left side of the vehicle body B such that the optical axis is directed outward, in the vehicle width direction, and rearward.

The left-rearview camera 12 is disposed, for instance, at a position adjacent to the side mirror 130.

The field of view (i.e., the capturable range) F12 of the left-rearview camera 12 partially overlaps the field of view F11 of the rearview camera 11 such that the entire range from the rear of the host vehicle to the left side can be captured with substantially no blind spot by at least one of the cameras.

The right-rearview camera 13 (not included in FIG. 2) is disposed in a substantially symmetrical manner with the left-rearview camera 12.

The stereo camera processing unit 20 performs known stereo camera processing on images captured by the left-front view camera 21 and the right-front view camera 22, and detects objects in front of the host vehicle and the distance of the objects from the host vehicle.

The output of the stereo camera processing unit 20 is transmitted to the environment recognition unit 30.

The left-front view camera 21 and the right-front view camera 22 capture video of the conditions in front of the vehicle and output image signals in real time. Each camera includes a solid-state imaging device such as a CMOS and a driving device thereof, a lens, and so on.

The left-front view camera 21 and the right-front view camera 22 are disposed, for instance, in proximity to the upper edge of the windshield in the vehicle interior and spaced apart in the left-right direction.

The environment recognition unit 30 perceives the surroundings of the host vehicle based on information provided from the rear-side view image processing unit 10, the stereo camera processing unit 20, the left-rearview radar 31, the right-rearview radar 32.

The environment recognition unit 30 associates together with the left-rearview radar 31 and the right-rearview radar 32. In one example, the environment recognition unit 30 may function as an "object-recognition unit".

The environment to be perceived includes the shape of the lane on which the host vehicle is traveling, the shape of the lane adjacent to the lane on which the host vehicle is traveling, other vehicles traveling around the host vehicle, pedestrians, obstacles such as built structures (e.g., buildings, guardrails, signs, traffic lights, bridge beams, tunnels, median strips, road side bands).

The left-rearview radar 31 and the right-rearview radar 32 are for detecting objects such as other vehicles which are in the rear-side view from the host vehicle.

For the left-rearview radar 31 and the right-rearview radar 32, a millimeter-wave radar, for instance, can be used.

The left-rearview radar 31 and the right-rearview radar 32 are capable of detecting the relative position of another vehicle with respect to the host vehicle when in the presence of another vehicle. Based on the movement of the relative position, the relative speed of the other vehicle with respect to the host vehicle can be calculated.

The left-rearview radar 31 and the right-rearview radar 32 are disposed on the left and right (e.g., within the rear bumper, see FIG. 2) in the rear portion of the vehicle body.

The driver monitoring unit 40 detects the posture, behavior, gaze direction of the user (i.e., the driver in manual operation) based on an image captured by the driver monitoring camera 41.

The driver monitoring camera 41 is provided on the front side of the driver in the vehicle interior.

In one example, the driver monitoring unit 40 may function as a "viewpoint-position detection unit" for detecting the viewpoint position when a user directly views the situation outside the vehicle with the naked eye.

The display image generating unit 50 generates a display image to be displayed on the LCD 70 based on inputs from the rear-side view image processing unit 10, the environment recognition unit 30, and the driver monitoring unit 40.

Functions of the display image generating unit 50 and examples of the generated display image will be described later in detail.

It should be noted that the displayed image may be a photographed image (i.e., a captured image) obtained by performing predetermined image processing on images captured by the rearview camera 11, the left-rearview camera 12, and the right-rearview camera 13, or may be a computer graphics image or the like (i.e., a generated image generated based on the captured image) for displaying information corresponding to the photographed image. Also, the displayed image may be synthesized by superimposing the captured image and the computer graphics image.

Further, the display image generating unit 50 has a function of issuing an instruction to the HUD device 80 to display an entry location indicator Ia when displaying an exit location indicator Id in the display image (described later).

The display control unit 60 is a display driving device for displaying the display image generated by the display image generating unit 50 on the LCD 70.

The LCD 70 is provided in front of the user (i.e., the occupant/driver during manual driving) and is a unit for displaying the displayed image, which includes information related to the rear-side view situation of the host vehicle, to the user. An exit location indicator Id, which will be described later, is superimposed on the display image and displayed as necessary.

The arrangement of the LCD 70 in the vehicle interior will be described in detail later.

In one example, the LCD 70 may function as a "display unit" and an "exit location indicator unit".

The head-up display (HUD) device 80 displays images, characters, or the like on a windshield 110, which will be described later, in response to input from a display image generating unit 50.

The HUD device 80 has a function of reflecting information displayed on, for instance, an LCD panel to a mirror and projecting the information as a virtual image on the windshield 110.

In one example, the HUD device 80 may function as an "entry location indicator unit".

Figure 3:
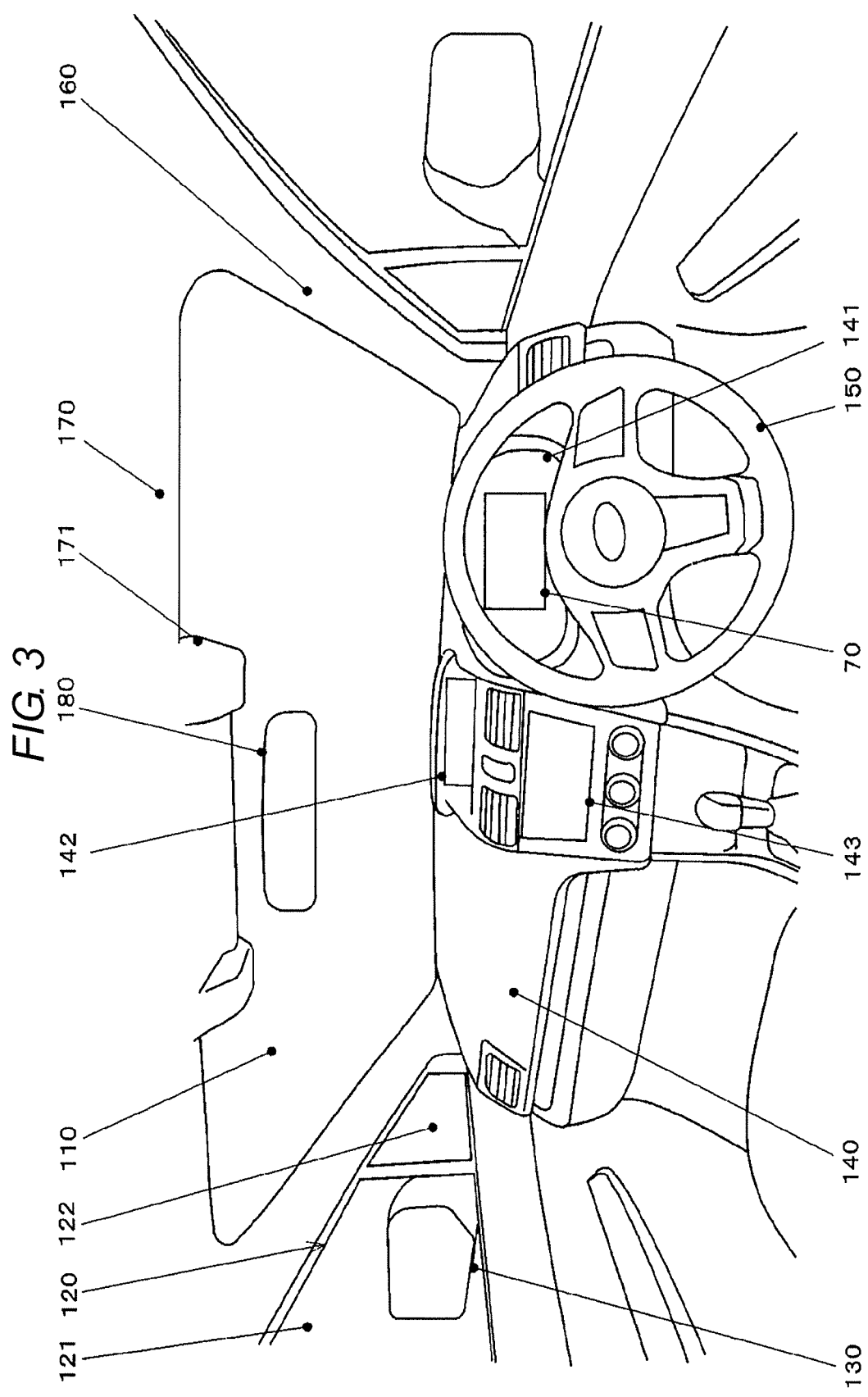
FIG. 3 is a drawing illustrating an instance of a user's field of view in a vehicle having the information-presenting device according to the example.

FIG. 3 is a drawing illustrating an example of a user's field of view in a vehicle having the information-presenting device according to the example.

As illustrated in FIG. 3, the vehicle has a windshield 110, a front door glass 120, a side mirror 130, an instrument panel 140, a steering wheel 150, an A-pillar 160, a roof 170, a interior rearview mirror 180, and so on.

The windshield 110 is a glass window disposed in front of the user (i.e., the driver).

The windshield 110 is a quadratic curved glass pane which is formed in a substantially oblong rectangular shape and curved in a direction in which the front is convex.

The windshield 110 is inclined rearward such that the upper edge of the windshield 110 is oriented toward the rear of the vehicle with respect to the lower edge.

The front door glass 120 is an upper portion of the left and right front doors used by an occupant for getting on and off the vehicle and is provided to a side of the driver.

The front door glass 120 has an elevating main body 121 and a fixed triangular window 122 provided at the front of the main body 121.

With the side mirror 130, on each side of the vehicle, the driver checks the left and right rear fields of view, respectively.

Each side mirror 130 protrudes outward in the vehicle width direction from the outer panels of the left and right front doors, respectively.

In the user's field of view, each side mirror 130, for instance, is seen near the front end of the main body 121 of the front door glass 120.

The instrument panel 140 is an interior member provided in the vehicle cabin below the windshield 110.

The instrument panel 140 also functions as a cabinet housing various instruments, such as display devices, switches, air conditioners, passenger airbag devices, knee protecting airbag devices.

The instrument panel 140 is provided with a combination meter 141, a multifunction display 142, a navigation device display 143, and so on.

The combination meter 141 is provided at the front of the driver's seating area, and is formed by unitizing various instruments such as a speedometer, an engine revolution meter, and a distance meter.

The combination meter 141 has a built-in LCD70.

The multifunction display 142 is an image display unit, such as an LCD, provided on the upper portion of the center of the instrument panel 140 in the vehicle width direction.

The navigation device display 143 is provided at the lower portion of the center of the instrument panel 140 in the vehicle width direction.

The steering wheel 150 is an annular operating member for inputting a steering operation when the driver manually operates the vehicle.

The steering wheel 150 is provided substantially in front of the driver.

The combination meter 141 is visible from the inner diameter side of the upper half of the steering wheel 150 in the user's field of view.

The A-pillar 160 is a columnar vehicle body structural member arranged along the side edge of the windshield 110 and the front edge of the front door glass 120.

The vehicle interior surface of the A-pillar 160 is covered with a resin pillar trim.

The roof 170 is formed to extend rearward from the upper edge of the windshield 110.

The vehicle interior surface of the roof 170 is covered by a plastic roof trim.

A stereo camera housing portion 171 which accommodates the left-front view camera 21 and the right front camera 22 is provided at the front edge of the roof 170 in the center in the vehicle width direction.

The interior rearview mirror 180 is a mirror for checking rearward provided in the vehicle interior.

The interior rearview 180 is provided via a stay (not illustrated) in proximity to the upper edge of the windshield 110 in the center in the vehicle width direction.

Next, the display image of the LCD 70 in the present example will be described.

The display image described below is generated by the display image generating unit 50 and is displayed on the LCD70 via the display control unit 60.

FIG. 4 is a drawing illustrating an instance of a display image of the information-presenting device according to the example in which another vehicle is in the rear view from the host vehicle.

FIG. 5 is a drawing illustrating another instance of a displayed image in the information-presenting device according to the example in which another vehicle is in the rear-side view from the host vehicle.

FIGS. 4 and 5 chronologically illustrate another vehicle passing the host vehicle from the right side.

In the example, a reference point P (see FIG. 2) is set at a rear-side portion of the vehicle body, and when viewed from the virtual viewpoint predetermined in the vehicle interior, the area to the rear of the reference point P with respect to the host vehicle is defined as the first area A1 and the area in front of the reference point P with respect to the host vehicle is defined as the second area A2.

The virtual viewpoint is predetermined, for instance, to the head position of the user (i.e., the driver in manual operation) detected by the driver monitoring unit 40.

As illustrated in FIGS. 4 and 5, the image of the first area A1 and the images of the second areas A2 on the right and left are continuously displayed in the same display image I1, I2.

A line Lg indicating the outer peripheral edge of each window glass when viewed from the virtual viewpoint is superimposed on the display image I1, I2 with images outside of the vehicle provided by the rear-side view image processing unit 10.

At this time, in the display image I1, I2, the image is in a state in which the pillar is seen through so that an object such as another vehicle can be visually observed even if it within a range corresponding to the pillar.

In addition, the display image I1, I2 can be inverted left to right so that the user does not feel uncomfortable, as when visually confirming the rear-side view from the vehicle using mirrors.

That is, in the display image I1, I2, the second area A2 displayed on the right side shows the situation in the right-rearview from the host vehicle, and the second area A2 displayed on the left side shows the situation in the left-rearview from the host vehicle.

In FIG. 4, another vehicle FV is behind the host vehicle and is included within the first area A1 of the display image I1.

On the other hand, in FIG. 5, the other vehicle FV is attempting to overtake the host vehicle by changing to an adjacent lane so that the other vehicle FV is in the rear-side view from the host vehicle with being included in the second area A2 of the display image I2.

When the other vehicle FV advances further relative to the host vehicle from this condition, the other vehicle FV moves to the right side of the display image I2, and finally departs from the display range, outside of the angle of view at the right edge of the display image I2 and disappears from the image.

Therefore, in the present example, the exit location indicator Id, which is a display indicating where the object departs from the display image, is displayed in proximity to the location where the object (in this case, the other vehicle FV) was displayed last (in this case, the right edge of the image).

The exit location indicator Id may, for instance, be displayed in advance prior to the object actually departing from the display range. Additionally, it is also possible to display the object a posteriori after the object has actually departed from the display range.

The exit location indicator Id is removed, for instance, after a lapse of a predetermined time set considering the length of time at which the driver can become aware of the exit location indicator Id after starting to display the exit location indicator Id.

On the other hand, the information-presenting device 1 of the present example displays the entry location indicator Ia with the HUD device 80 so that the entry location indicator Ia is substantially superimposed on the real view of the object at a location where the entrance of the object (i.e., the other vehicle FV in this case) is predicted in the field of view through the windshield 110.

FIG. 6 is a drawing illustrating another instance of a user's field of view in the vehicle having the information-presenting device according to the example, and illustrates an indication of an entry location.

The entry location indicator Ia is displayed in proximity to a location where an object (i.e., the other vehicle FV in this case) first becomes visible through the windshield 110.

In the instance illustrated in FIG. 6, the other vehicle FV is passing from the right side of the host vehicle, and the entry location indicator Ia is disposed in proximity to the right edge of the windshield 110.

In addition, in the situation illustrated in FIG. 6, the displayed image I2 shown in FIG. 5 is displayed on the LCD 70. The display image I2 includes an exit location indicator Id.

The entry location indicator Ia is, for instance, starts simultaneously with the start of displaying of the exit location indicator Id, and thereafter, the display is continued at least until the object appears within the field of view through the windshield 110.

At this time, the driver monitoring unit 40 detects the direction of the user's line of sight. The HUD device 80 may be configured to delete the entry location indicator after the driver monitoring unit 40 confirms that the user's line of sight is directed in the direction of the entry location indicator Ia.

Note that any figure, such as symbol, pictogram, character, image, can be used alone, or in combination as the exit location indicator Id or the entry location indicator Ia.

The exit location indicator Id and the entry location indicator Ia are, for instance, recognized by the environmental recognition unit 30, and are displayed for an object for which the risk level of collision with the host vehicle is determined to be equal to or more than a predetermined value.

The environment recognition unit 30 determines collision risks based on, for instance, relative position to the host vehicle, relative speed, object size, absolute velocity, and so on.

Further, the location where the entry location indicator Ia is displayed is set so as to be at the position or in proximity to where the object first appears as viewed from the viewpoint position of the user, taking into account the viewpoint position of the user (driver at the time of manual operation) detected by the driver monitoring unit 40.

The display image generating unit 50 indicates the display position of the entry location indicator to the HUD device 80 via the display control unit 60 based on the viewpoint position provided by the driver monitoring unit 40.

According to the example described above, when the other vehicle FV advances with respect to the host vehicle and departs from the display image I2 displayed on the LCD 70, the exit location indicator Id is displayed in proximity to the location where the other vehicle FV was last displayed on the display image I2 and the user can be notified that confirmation through the image is not possible.

Additionally, it is possible to display the entry location indicator Ia in proximity to the location where the other vehicle FV is first viewable in the windshield 110 to guide the line of sight of the user to the entry location and prevent the user from losing sight of the other vehicle FV.

Further, by setting the display location of the entry location indicator Ia based on the viewpoint position of the user (i.e., the occupant responsible for monitoring the surroundings and the driver at the time of manual operation), the entry location indicator Ia can be displayed at a suitable location even when there are variations in the physical size, the seating position, the seating posture, and so on.

(Modification)

The present invention is not limited to the above-described examples. Various modifications and changes are possible, and they are also within the technical scope of the present invention.

(1) The configuration of the image display device and the vehicle on which the image display device is mounted is not limited to the above-described example and can be appropriately changed.

For instance, the quantity and arrangement of cameras and radars can be appropriately changed. The example provides one each of a rearview, left-rearview, and right-rearview camera, but a configuration provided with a plurality of each camera is also permissible. Further, for instance, rearview camera and rear-side view camera functions may be combined by using a single wide-angle camera.

(2) In the example, the HUD device 80 is used to project the entry location indicator on the windshield 110, but the configuration of the entry location indicator unit is not limited to this and may be changed as appropriate.

For instance, a light source such as an LED lamp may be provided to the A-pillar, an instrument panel, and the like, and turned on. In addition, a light source or a display device may be provided to another part such as a side mirror adjacent to the glass window.

(3) In the example, the reference point P is set at the rear-side end of the rear bumper but the setting of the reference point can be appropriately changed. For instance, the reference point may be set at an any position such as the trunk lid top surface, the rear edge of the roof, a side edge of the roof, in proximity to a rear combination lamp, and so on.

Further, instead of such a reference point, the second area may be set in front side of a reference line disposed substantially along the front edge and the rear edges of a pillar provided in the rearmost part of the vehicle body as viewed from a virtual viewpoint. The pillar may be a C-pillar in the case of a three-box car or the like, a D-pillar in the case of a station wagon car, and so on.

In addition, the position of the virtual viewpoint is not limited to the position of the user's head, and can be appropriately changed. For instance, the position of the interior rearview mirror provided in the vehicle interior may be set as the virtual viewpoint.

The invention claimed is:

1. An information-presenting device comprising:
    an imaging unit configured to capture an image of an object at a side of a host vehicle;
    one or more detectors that recognize the object at the side of the host vehicle, the object moving forward relative to the host vehicle;
    a first display that displays an exit location indicator at or near a location where the recognized object is last displayed in the first display when the recognized object departs from a display range of the first display; and
    a second display disposed on a windshield of the host vehicle, the second display displaying, in proximity of a location where the object is first viewable in the windshield, an entry location indicator 1) corresponding to the recognized object that has departed from the display range of the first display and 2) indicating a location in which the object is predicted to appear such that the entry location indicator is superimposed on a real view of the object when the object enters a field of view through the windshield at a location where an entrance of the object is predicted, the second display being different from the first display.

2. The information-presenting device according to claim 1, wherein the exit location indicator is displayed near an edge on a front side of the host vehicle within a display area of the first display, and
    the entry location indicator is displayed near a side edge of a windshield.

3. The information-presenting device according to claim 1, further comprising a viewpoint position detection unit configured to detect a viewpoint position of a user in the host vehicle, wherein
    a position for displaying the entry location indicator is determined based on the viewpoint position of the user.

4. The information-presenting device according to claim 2, further comprising a viewpoint position detection unit configured to detect a viewpoint position of a user in the host vehicle, wherein
    a position for displaying the entry location indicator is determined based on the viewpoint position of the user.

5. The information-presenting device according to claim 1, wherein the first display displays a display image of the captured image or an image generated based on the captured image, and
    a display of the recognized object in the display image moves toward a side edge of the display image in accordance with a movement of the object moving forward relative to the host vehicle.

6. The information-presenting device according to claim 1, wherein a display of the entry location indicator is started responsive to a start of a display of the exit location indicator, and the display of the entry location indicator is displayed at least until the object appears within a field of view through the windshield.

7. The information-presenting device according to claim 1, wherein the exit location indicator is displayed near an edge of the first display, and the entry location indicator is displayed near an edge of a windshield.

8. The information-presenting device according to claim 1, further comprising a viewpoint position detection unit configured to detect a viewpoint position of a user in the host vehicle or a viewpoint position of a driver of the host vehicle, wherein the location where the object is first viewable in the windshield of the host vehicle is set based on the viewpoint position of the user in the host vehicle or the viewpoint position of the driver of the host vehicle.

* * * * *